(12) United States Patent
Tarasinski et al.

(10) Patent No.: US 7,729,830 B2
(45) Date of Patent: Jun. 1, 2010

(54) VEHICLE CONTROL SYSTEM

(75) Inventors: Nicolai Tarasinski, Frankenthal (DE); Klaus Hahn, Mannheim (DE)

(73) Assignee: Deere & Company, Moline, IL (US)

( * ) Notice: Subject to any disclaimer, the term of this patent is extended or adjusted under 35 U.S.C. 154(b) by 50 days.

(21) Appl. No.: 12/135,658

(22) Filed: Jun. 9, 2008

(65) Prior Publication Data

US 2009/0143941 A1 Jun. 4, 2009

(30) Foreign Application Priority Data

Jul. 11, 2007 (DE) .................. 10 2007 032 309

(51) Int. Cl.
| | |
|---|---|
| A01B 69/00 | (2006.01) |
| B62D 6/00 | (2006.01) |
| B62D 11/00 | (2006.01) |
| B62D 12/00 | (2006.01) |
| B63G 8/20 | (2006.01) |
| B63H 25/04 | (2006.01) |
| G05D 1/00 | (2006.01) |

(52) U.S. Cl. .................. 701/41; 701/1; 701/50; 180/422

(58) Field of Classification Search .................. 701/1, 701/41, 42, 50, 84, 87; 180/422, 443, 446
See application file for complete search history.

(56) References Cited

U.S. PATENT DOCUMENTS

| | | | | |
|---|---|---|---|---|
| 5,636,909 A | * | 6/1997 | Hirao et al. | 303/140 |
| 5,735,584 A | * | 4/1998 | Eckert | 303/140 |
| 5,828,972 A | * | 10/1998 | Asanuma et al. | 701/41 |
| 5,988,312 A | * | 11/1999 | Nishino et al. | 180/446 |
| 6,015,193 A | * | 1/2000 | Vogel et al. | 303/147 |
| 6,370,459 B1 | * | 4/2002 | Phillips | 701/41 |
| 6,523,635 B1 | * | 2/2003 | Johnston et al. | 180/307 |
| 6,611,745 B1 | * | 8/2003 | Paul | 701/41 |
| 6,616,250 B1 | * | 9/2003 | Fennel et al. | 303/139 |
| 6,694,239 B1 | * | 2/2004 | Yao et al. | 701/41 |
| 6,695,092 B2 | * | 2/2004 | Cole | 180/444 |
| 6,705,685 B1 | * | 3/2004 | Halat et al. | 303/141 |
| 2003/0164260 A1 | * | 9/2003 | Cole | 180/428 |
| 2004/0217575 A1 | * | 11/2004 | Beaujot et al. | 280/442 |
| 2004/0256913 A1 | * | 12/2004 | Schmidt et al. | 303/139 |
| 2005/0027415 A1 | * | 2/2005 | Iwazaki et al. | 701/36 |
| 2005/0045413 A1 | * | 3/2005 | Shitamitsu et al. | 180/402 |

FOREIGN PATENT DOCUMENTS

| | | |
|---|---|---|
| DE | 199 04 626 | 8/2000 |
| DE | 199 23 012 | 11/2000 |
| DE | 109 09 206 | 9/2003 |
| EP | 0856432 | 8/1998 |
| EP | 1 777 094 | 3/2008 |

\* cited by examiner

*Primary Examiner*—Khoi Tran
*Assistant Examiner*—Jaime Figueroa

(57) ABSTRACT

A vehicle control system includes a steering wheel, such as an steering wheel, an adjusting device, a sensor and a control unit. The steering wheel may be actuated by the hand of an operator to set a state variable of the vehicle. The adjusting device applies a force to the steering wheel. A sensor senses a variable representing a state variable of the vehicle and transmits a sensor signal to the control unit. The control unit determines a state variable of the current operating state of the vehicle. The control unit, depending on the current operating state of the vehicle, controls the adjusting device so that a predetermined force is applied to the steering wheel, in order to make the operator aware of an unsafe operating condition.

28 Claims, 5 Drawing Sheets

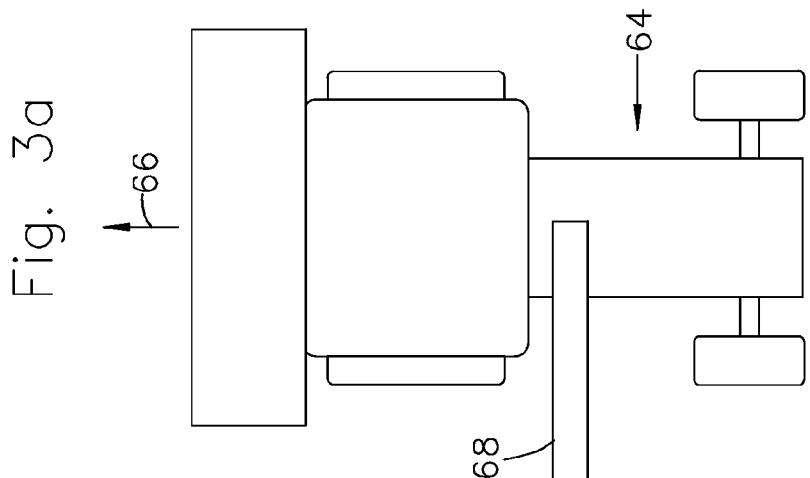
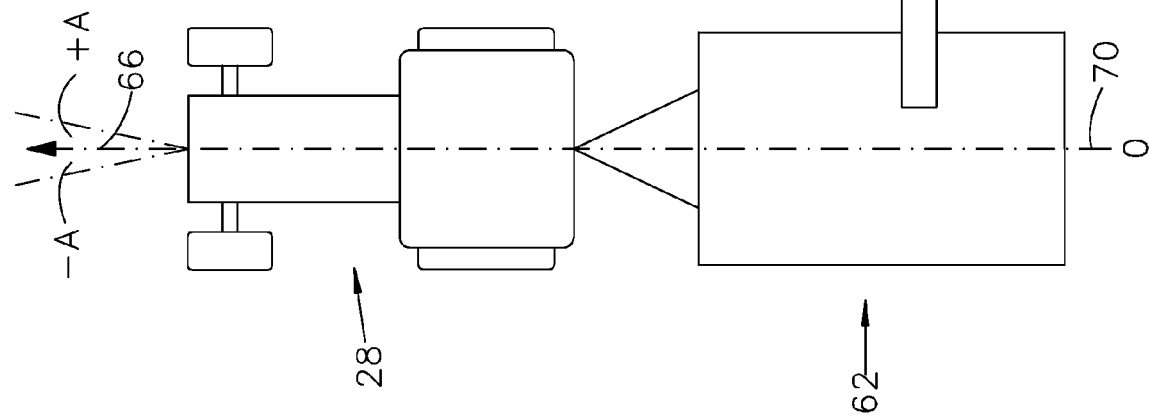
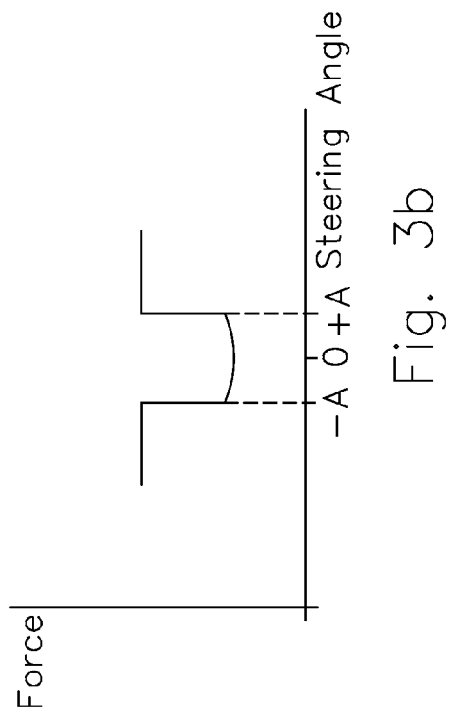

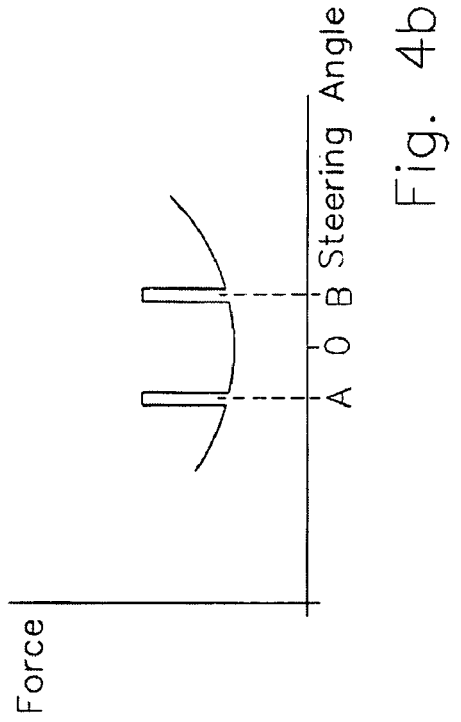
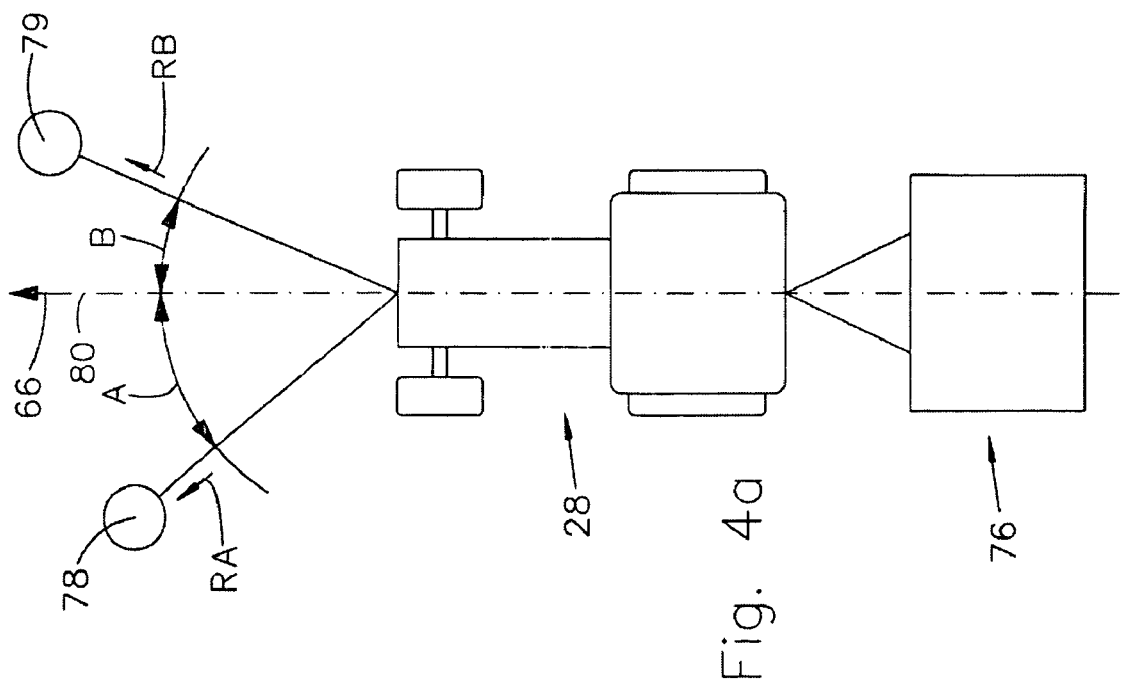

VEHICLE CONTROL SYSTEM

FIELD OF THE INVENTION

The present invention relates to a control system for a vehicle.

BACKGROUND OF THE INVENTION

Manually operated steering wheels are used to control the travel direction of vehicles.

Moreover, force-feedback is known from the field of simulator technology and is used to realistically represent forces on operating elements, which occur during the operation of machines and which must be applied and/or overcome by the operator.

In many vehicles, the operating elements are mechanically connected to a machine part. For example, the steering wheel is connected by a steering shaft to the steering gear. If such a mechanical connection is omitted due to an electronic control of the respective component, a corresponding feedback about the conditions of the machine part and the machine/vehicle to be simulated is not provided to the operator. In such a case, the technology known from simulator technology is utilized, namely by the operating element or steering wheel being acted upon by forces using an adjusting device, which is controlled by a suitable control unit, such that a conventional operating characteristic for the operating element may be produced. As a result, an operation of the respective function controlled by the operating element which is as realistic as possible is simulated to an operator.

Extensive assistance during the operation of a utility vehicle is, however, made known to the operator visually or possibly acoustically by warning display elements. In this case, primarily warning lights are provided which indicate a critical state of the utility vehicle, for example that of an excessive temperature of the engine oil or of the coolant above a predetermined upper threshold.

SUMMARY OF THE INVENTION

Accordingly, an object of this invention is to provide a system which assists a vehicle operator.

A further object of the invention is to provide such a system by means of which an operator is also made aware in an improved manner of an operating state of the utility vehicle which is critical or not optimal.

These and other objects are achieved by the present invention, wherein a control system includes a steering wheel, an adjusting device, a sensor and a control unit. The steering wheel may be manipulated by an operator to steer the vehicle. The adjusting device and/or an actuator applies a force to the steering wheel. The sensor senses a variable representing a state variable of the utility vehicle and transmits it to the control unit. The control unit determines a current operating state of the vehicle. The control unit, depending on the currently operating state of the vehicle, controls the adjusting device so that the steering wheel is acted upon by an altered predetermined force, in order to make the operator aware of a less than optimal operating state or operating function. The altered force could, for example, be a constant or variable force.

According to the invention, operation of the vehicle may be simplified and optimized if an operating state which is unsafe or not optimal is not displayed to the operator merely by visual display instruments. Conventionally, the vehicle has a tachometer for displaying the engine speed. If the engine is continuously operated at an increased speed which is above the maximum speed provided for continuous operation, with a conventional vehicle there is no further indication, apart from increased noise generation of the engine, which with a relatively well sound-insulated cab of the vehicle may not be perceived acoustically in all cases. This may lead to engine damage and thus to a longer period of the vehicle being out of operation and thus to high resulting costs. According to the invention, it is therefore provided that optionally the operator is made aware in a tactile manner of such an operating state of the vehicle via an acoustic and/or visual warning device. This is advantageous, in particular, when the operator as a result of the situation has to react immediately in any manner, in order for example to be able to prevent an overload of a component of the vehicle or an accident to the vehicle.

The control unit may calculate, using the sensor signal, in which direction and/or position the steering wheel might have to be moved, in order to achieve the desired purpose. The effects of adjusting a state variable are generally known. The position and/or the direction of displacement of the steering wheel, which might result in an optimal operating state, are determined. The adjusting device is controlled according to the result of a comparison between the calculated, advantageous direction of movement and/or position and the current direction of movement and/or position of the steering wheel.

Information about the position of the steering wheel—the current position detected by means of the steering wheel position sensor—is moreover preferably supplied to the control unit, which may be taken into consideration when calculating the desirable and/or undesirable direction of displacement and/or position of the steering wheel. In a few applications, however, it is not necessary to take into account the position of the steering wheel. It is also conceivable that the control unit derives information about the position of the steering wheel and/or the direction of movement thereof from the signal of the sensor and/or the alteration thereof.

The adjusting device may be operated in two different ways. On the one hand, it may generate a displacement resistance and/or an amplitude and/or frequency of the mechanical activation of the steering wheel, which is proportional to the difference between the current position of the steering wheel and a calculated, optimal position of the steering wheel. Or it may act on the steering wheel in a different manner, which depends on this difference in a manner which is continuous and preferably monotonically increasing. If the steering wheel poorly therefore, is poorly adjusted, it is very difficult to move it into an even more unfavorable position and/or it vibrates very strongly or rapidly. In the opposing direction, however, it may be easily moved and/or the vibrations reduce or disappear. On the other hand, there is the possibility that the adjusting device is only effective when the aforementioned difference exceeds a specific threshold value. In this case, the adjusting device may cause a displacement resistance increasing incrementally and/or the amplitude and/or frequency of the mechanical activation may be altered incrementally. The displacement resistance and/or the amplitude and/or frequency of the mechanical activation of the steering wheel therefore increases in this embodiment in at least one step. One advantage is in the easier technical implementation, as the adjusting device in the simplest case only has to be designed to be able to be switched on and switched off.

The control unit, depending on the current operating state of the vehicle, controls the adjusting device so that the steering wheel may be acted upon by an altered predetermined force, in order to make the operator aware of an unsafe operating state of the vehicle or an unsafe operating state of at least one operating function.

Preferably, by subjecting the steering wheel to a predetermined altered force, the operating characteristic of the steering wheel is varied. Thus, for example, the steering wheel could be acted upon by a force such that said steering wheel may be operated as a whole only by the application of increased force by the operator. In other words, within the scope of this embodiment, the force with which the steering wheel is acted upon by the adjusting device in a normal operating state of the vehicle, is increased by a constant value (offset), if an operating state of the vehicle is present which is not optimal or safe.

The sensor senses a variable which represents a state variable of the vehicle, such as the speed, the acceleration, the direction of travel, the currently set steering angle, the deviation from a predetermined direction of travel, the spatial position of the vehicle, the yaw movement or the yaw moment, the determination of an obstruction, the speed of an engine shaft or gear shaft, the speed of at least one wheel, the torque transmitted by a shaft, the torque output from a power plant, the performance or the capacity utilization of a power plant, the energy consumption or the fuel consumption of a consumer, the slippage of the vehicle on the ground, an axial load, the pressure or the volumetric flow or the volumetric flow alteration of a hydraulic fluid, the travel of a cylinder, the driving state, the motive force of the vehicle and/or the force of a trailer and/or of an implement acting on the vehicle. A force acting on the vehicle may, in particular, be a tractive force, a transverse force and/or a supporting force. The sensor could also detect the speed of an engine shaft or gear shaft, the speed of at least one wheel, the torque transmitted by a shaft, the torque output by a power plant, the performance or the capacity utilization of a power plant, the energy consumption or the fuel consumption of a consumer, the slippage of the vehicle on the ground, an axial load, the pressure or the volumetric flow or a volumetric flow alteration of a hydraulic fluid, the travel of a cylinder, the tractive force of a trailer and/or an implement acting on the vehicle, the driving state and/or the motive force of the vehicle. The sensor generates an electrical signal which represents the detected variable, which is transmitted to the control unit. The control unit, depending on the currently operating state of the vehicle, generates a signal and/or a signal sequence which controls the adjusting device.

The adjusting device comprises an actuator which is operated electrically, pneumatically or hydraulically, and which applies a changeable and/or variable force to the steering wheel. The adjusting device could, moreover, comprise a further actuator such as a spring and which subjects the steering wheel to a constant force and/or to a constant force characteristic.

An optimal operating state of the vehicle is, in particular, present when the vehicle has a minimized fuel consumption and/or when the driving speed or the efficiency of the vehicle and/or individual components thereof is/are optimally adapted to the currently present operating mode of the vehicle. In other words, individual components and/or the entire vehicle is adjusted such that the efficiency thereof is optimized for the currently present operating mode of the vehicle and/or adapted thereto. A currently present operating mode could, for example, be plowing with a tractor, i.e. a plough being adapted to the tractor, In a further step, a different currently present operating state could refer to the sowing of plant seed, when a sowing machine is adapted to the tractor. An optimal operating state is also desired for the case in which the crops processed and/or treated by the vehicle and possibly by an implement adapted to the vehicle, have an optimal throughput or turnover. A tractor with a round baler adapted to the tractor could represent an example thereof. In an optimal operating state, the round baler is operated such that the hay received by the round baler is received at a maximum delivery speed (maximum throughput), without causing a blockage.

A safe operating state of the vehicle is, in particular, when the engine capacity utilization, the angle of the vehicle relative to the horizontal, the yaw moment, the counterweight of the vehicle with an implement possibly adapted thereto, the torque loading prevailing in the drive train and/or the speed of rotating components present in the drive train and/or the speed of the vehicle (also during cornering) do not exceed a correspondingly predetermined threshold value. Further safety-relevant parameters are, for example, also the aforementioned engine oil temperature, the temperature of the coolant of the internal combustion engine of the vehicle or the pressure of a hydraulic braking system. Accordingly, a safe operating state of the vehicle is present when the corresponding predetermined threshold values are not exceeded and/or fallen below. A safe operating state of the vehicle is also present when there is no obstruction in the driving area or the effective area of the vehicle. In other words, an unsafe operating state is present when the corresponding predetermined threshold values are exceeded or fallen below and/or when an obstruction is in the driving area or effective area of the vehicle.

With vehicle variables which may not be immediately noticed by the operator, the control system is helpful for an optimal and/or safe operation of the vehicle. This could primarily be relevant with trailers suspended on the vehicle (for example a spray with an extended spray bar), which for example due to ground unevenness may carry out rolling and/or yaw movements and thus move the unit consisting of the vehicle and the trailer into a dangerous overall state, in particular during cornering. The steering wheel could be acted upon by a force such that the operator is instructed to deflect the steering wheel to a smaller radius of curvature.

The adjusting device could be activated by the control unit so that the adjusting device acts upon the steering wheel with a substantially constant force. Such a mode of operation could, in particular, refer to the state of the steering wheel in which said steering wheel is in the neutral position and not actuated by an operator.

Alternatively or additionally thereto, the adjusting device could act upon the steering wheel with a predetermined force function. The predetermined force function could, depending on the actuating path and/or the deflection of the steering wheel or the state variable to be controlled, have a constant analytical function. The analytical function could be temporally altered and thus take account of an altered operating state of the vehicle.

In particular, when the vehicle approaches an unsafe operating mode or the operator misuses an operating function or a vehicle function, the adjusting device could act on the steering wheel located in the neutral position or in any position, with a temporally variable force. This is useful, in particular, in operating states in which the respectively present state variable or the respectively present critical variable may not be immediately perceived by the operator. This could, for example, refer to the torque which in a tractor is transmitted via the power take-off shaft to an implement adapted to the tractor and which exceeds a predetermined threshold value. Accordingly, the steering wheel could be acted upon by the adjusting device with a temporally variable force such that the steering wheel undergoes a type of jolting movement and as a result makes the operator aware in a tactile manner of a critical operating state.

Preferably, the steering wheel is acted upon by a predetermined altered force if an operating state deviates from the optimal operating state.

This is, amongst others, the case when the currently present operating state and/or a currently present state variable of the vehicle or an operating function of the vehicle exceeds or falls below a predetermined threshold value. In this case, for example, it may be a pressure of a hydraulic fluid above a maximum value, with which a hydraulic cylinder of a loader may be controlled, the loader being able to be adapted to a tractor. Such a situation could, for example, indicate an overload when lifting the loading bucket.

The steering wheel could be acted upon by a predetermined altered force, if the speed of a shaft and/or the speed of a shaft of an implement deviates from a predetermined speed.

Preferably, the steering wheel may be acted upon by a predetermined altered force which depends on the speed of the utility vehicle. In particular at a higher vehicle speed, the force acting on the steering wheel may be greater than at lower speeds.

Preferably, the steering wheel is acted upon by a predetermined altered force, which depends on the nature of the road and/or the ground. In particular with uneven and/or rough ground—also by taking into account the currently present vehicle speed—the counter force for setting a greater steering angle may be increased in order to achieve thereby an improved hold of the utility vehicle on the ground.

The steering wheel could be acted upon by a predetermined altered force which depends on the force to be applied for steering the wheels. As a result, feedback of the force actually to be applied for steering the wheels may be provided in tactile form to the operator on the steering wheel. This is expedient, in particular. when a continuous mechanical connection does not exist (steer by wire) between the steering wheel and the steering cylinder.

Moreover, the steering wheel could be acted upon by a predetermined altered force, which depends on the deviation from a desired state of the steering cylinder and/or the set steering angle. As a result of this measure, a steering process may be assisted such that the operator of the utility vehicle is assisted to find an optimal desired direction of travel, this assistance being an active steering suggestion and not automatic steering ("autopilot"). The desired direction of travel could in this connection cooperate with an observed radio bearing or a program for determining an optimal desired direction of travel and a position determining system.

Preferably, the steering wheel may be acted upon by a predetermined altered force, which depends on the load of the steering axle or the steered wheel. Thus the steering wheel could be acted upon by a relatively high force, when the load on the steering axle of the utility vehicle has a comparatively large value. In principle, the utility vehicle could have front axle steering, which is configured in the form of an individual wheel suspension or a rigid axle body.

Moreover, the steering wheel could be acted upon by a predetermined altered force which depends on the direction of travel. In particular during a reverse movement, the force from the adjusting device acting on the steering wheel is higher than during a forward movement. A comparatively high force could also act from the adjusting device on the steering wheel when, during cornering, the controlled direction of travel approaches the maximum adjustable steering angle.

Preferably, the steering wheel may be acted upon by a predetermined altered force which depends on the desired direction of travel of the utility vehicle. Thus the force exerted by the adjusting device onto the steering wheel is increased when the operator deflects the steering wheel such that the utility vehicle deviates from the desired direction of travel. The force exerted by the adjusting device on the steering wheel could then be minimized when the operator deflects the steering wheel such that the utility vehicle substantially follows the desired direction of travel. As a result, advantageously, a steering system may be implemented based on a steering suggestion and not on automatic steering.

Also the steering wheel could be acted upon by a predetermined altered force if the speed of the vehicle deviates from a predetermined speed. If the vehicle exerts an operating function, which requires a forward movement of the vehicle at a substantially constant speed (for example sowing), by altering the force at which the steering wheel is acted upon, the operator could be made aware of this circumstance. Another application, in which the speed of the vehicle is to have a predefined value, is that of a tractor which drives next to a harvesting machine and has a trailer. Here, during the harvesting operation of the harvesting machine, the crop can be moved during driving onto a trailer which is pulled by the tractor. During this operation, the relative position between the harvesting machine and the tractor including the trailer should remain substantially unchanged. Accordingly, it can be signaled that the speed is to be reduced or increased to the operator of the tractor and/or the operator of the harvesting machine in a tactile manner via the respective steering wheel. Corresponding sensors are presupposed for determining the relative position between the harvesting machine and the tractor including the trailer.

Preferably, the steering wheel may be acted upon in its neutral position by the adjusting device at least in a specific operating state of the vehicle by a predetermined high force. The steering wheel may be deflected from its neutral position by a single application of correspondingly high force by the operator, in order to transfer the vehicle and/or an operating function of the vehicle from a safe state into an operating state. The operator has to exert a relatively high force for controlling the function for the first time, in order to control the function at all. If the function is then controlled, it is proposed that the steering wheel is no longer subjected to the predetermined high force and/or that this is done again only if the steering wheel has not been actuated for a long period of time. In the same manner, an acknowledgement of the start-up of the vehicle or an acknowledgement of a switching for a gearbox switching operation could be implemented, i.e. the control actually desired by the operator is acknowledged by overcoming the high force.

Moreover, the steering wheel may be acted upon by a predetermined force in order to make the operator aware that an alteration of a state variable of the vehicle controlled by the steering wheel or an operating function has been set in the meantime. In a comparable manner, the steering wheel could be acted upon by a predetermined force in order to make the operator aware that a specific state of an implement adapted to the vehicle is present. This could, for example, be the case if an implement is attached and said implement only achieves its operating speed after a time delay. If this is present, the steering wheel could be acted upon by a force impulse.

Preferably, the steering wheel may be acted upon by a predetermined variable force, which depends on a guide means or on the deflection of a control switch. The control switch could be a mechanical lever arrangement arranged on the tractor, which for example may be deflected by guide rails arranged fixedly in a recess. In principle, the control switch or the guide means could operate on a mechanical, visual, acoustic and/or electrical basis. Thus with a position detection system based on laser or GPS, the relative position of the tractor could be detected and compared with a predetermined direction of travel. When deviating between a predetermined direction of travel and the actual direction of travel, the steering wheel could be acted upon by a corresponding force.

Preferably, the level of force at which the steering wheel may be acted upon, may be individually set by the operator. As a result, for example, each operator is able to set and/or possibly store an individually adapted operating characteristic of the steering wheel. This allows an adjustment of the steering wheel characteristic adapted individually thereto and may thus avoid faulty operation and/or allow individual ergonomic operation.

Preferably, a predetermined operating characteristic may be marked on the steering wheel such that an operator may relocate a desired setting—possibly adjustable by the operator—a deflected position or a deflection range of the steering wheel. Such a desired setting could be a speed or a speed range for a particular application or a particular operating use of the vehicle.

In a comparable manner, an adjustable "stop" of the steering wheel could be provided which possibly may be predetermined and/or adjusted by the operator, which permits the location of a particular speed limit.

Preferably, the steering wheel may be acted upon by a force so that an operator avoids a disadvantageous adjusting range of an operating state of an operating function or state variable of the vehicle—for example the natural frequency of the tires at specific speeds. The natural frequency of the engine suspension (dependent on the engine speed) and/or the natural frequency of the vehicle body could also have an unfavorable adjustment range, and could therefore in a comparable manner signal to the operator by subjecting the steering wheel to a corresponding force to avoid this setting.

In a further embodiment, a steering wheel may be acted upon by a predetermined force which is substantially dependent on the state of a different operating element of the vehicle. As a result, for example, a mutual locking of a plurality of operating elements may be simulated or an incorrect operation of the vehicle avoided.

It could be provided that the force exerted by the adjusting device on the steering wheel may be overridden and/or switched off by the operator. An overriding of the force exerted on the steering wheel by the operator should generally be possible, as it is not only intended that the operator feels that he/she has control over the operation of the vehicle. In addition, for safety reasons, the vehicle is also intended to be able to be operated by the operator if the steering wheel is acted upon by an incorrect force. This could be the case if a sensor detects a variable in error or the detected variable is interpreted incorrectly, although the probability of this occurring is only low. To this extent, the possibility of overriding a force which is exerted on the steering wheel represents a comparable possibility which a vehicle operator has with a navigation unit. There too, the operator can decide whether he selects the route which is proposed by the navigation unit or another route.

In addition to subjecting the steering wheel to a predetermined force, a visual and/or acoustic signal could be generated. This is provided, in particular, if a safe operating state of the vehicle and/or an operating function is abandoned. In this case, for example, a light source could be activated, possibly with increasing light intensity with increasing degrees of danger. Additionally or alternatively, an acoustic signal in the form of a warning tone (possibly with increasing loudness) could be generated via a loudspeaker and brought to the attention of the operator. Thus it could be provided that an operator may be warned in a tactile and visual manner on the steering wheel as well as acoustically in the cab of a safety risk, preferably with respect to a function which is controlled by the steering wheel.

In a preferred embodiment, a predetermined operating characteristic may be marked on the steering wheel such that an operator may relocate a desired setting—possibly adjustable by the operator—a deflected position or a deflection range of the steering wheel. Thus for example for a specific application—a tractor with a baler adapted thereto—the expedient and/or possible steering angle range may be restricted, in particular during turning maneuvers. Accordingly, the force exerted by the adjusting device on the steering wheel could be measured such that within the possible steering angle range of the steering wheel a relatively small force is exerted on the steering wheel and outside the steering angle range of the steering wheel a relatively high force is exerted on the steering wheel. An individually adapted operating characteristic for different applications might be able to be stored in a memory device and recalled. The memory device could be associated with the control unit.

Alternatively or additionally, individually adapted operating characteristics might be able to be stored and recalled in a memory card associated with the operator or in an RFID tag (radio frequency identification tag) associated with the operator and preferably provided in a vehicle key.

In a comparable manner, an adjustable "stop" of the steering wheel could be provided which possibly may be predetermined and/or adjusted by the operator. Such a stop could be a predetermined value of a deflected position of the steering wheel, which should not be exceeded, as otherwise there is the danger that a wheel of the steering axle collides with a component of the vehicle chassis or an engine bonnet, as may occur with tractors.

In a comparable manner, an adjustable "stop" of the steering wheel could be provided which possibly may be predetermined and/or adjusted by the operator. Such a stop could be a predetermined value of a deflected position of the steering wheel, which should not be exceeded, as otherwise there is the danger that a wheel of the steering axle collides with a component of the vehicle chassis or an engine bonnet, as may occur with tractors.

In a further embodiment, the steering wheel may be acted upon by a predetermined force which is substantially dependent on the state of a different operating element of the utility vehicle. As a result, for example, a mutual locking of a plurality of operating elements may be simulated, for example the steering wheel and a parking brake. If the parking brake is activated, the steering wheel could also be acted upon by a relatively high force in its currently present position. This then has to be overcome in order to deflect the steering wheel. Thus a mechanical coupling of an operating element and the steering wheel, which might possibly be required, is not necessary.

The vehicle could be a self-propelled working machine and/or a tractive machine in the field of agriculture, construction or forestry. In particular, the vehicle could be a tractor, a harvesting machine, a combine harvester, a forage harvester, a construction machine and/or a forestry machine. Accordingly, the function controlled by the steering wheel of the control system could be a vehicle or operating function characteristic of the respective vehicle.

BRIEF DESCRIPTION OF THE DRAWINGS

FIG. 3a is a top view of an agricultural vehicle and a trailer, which is driven adjacent to a harvesting machine;

FIG. 3b is a diagram of the force exerted on the steering wheel depending on the relative position between the unit and the harvesting machine;

FIG. 4a is a top view of an agricultural vehicle which is driving towards an obstruction;

FIG. 4b is a diagram of the force exerted on the steering wheel depending on the distance to the obstruction;

DESCRIPTION OF THE PREFERRED EMBODIMENT

Figure 1:
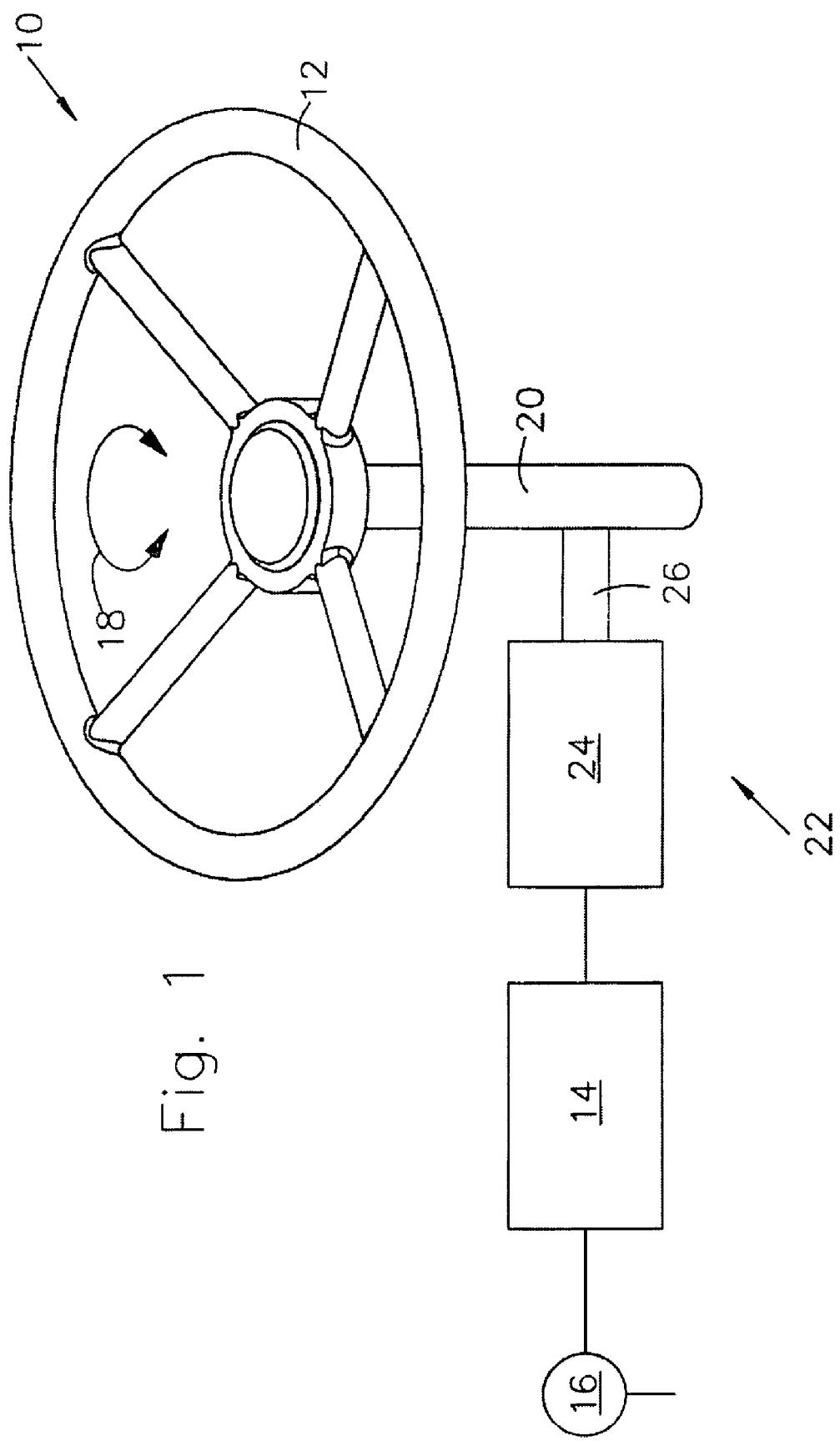
FIG. 1 is a schematic diagram of a control system according to the invention.

Referring to FIG. 1, the control system 10 has a steering wheel 12, a shaft or steering column 20, a control unit 14 and a sensor 16. The steering wheel 12 may be pivoted about the axis of shaft 20 in the direction of the double arrow 18. The control system 10 controls the travel direction of the agricultural vehicle or tractor shown in FIG. 2.

The control system 10 also includes an adjusting device 22, which comprises an actuator 24. The actuator 24 has an electric motor, which may be controlled by the control unit 14 via a power electronics unit (not shown). A gear train 26 transmits the torque produced by the electric motor to the steering column 20. The actuator 24 acts via the gear train 26 on the steering wheel 12 with a torque which may act in an clockwise direction or in an anticlockwise direction.

A sensor (not shown) on the actuator 24 senses the current position of the steering wheel 12 and transmits a sensor signal to the control unit 14. The sensor 16 detects the speed of the vehicle which is transmitted to the control unit 14.

The control unit 14, depending on the currently present state of the vehicle, controls the adjusting device 22 and thus the actuator 24 so that the steering wheel 12 may be acted upon by a predetermined altered force. As a result, an operating state of the vehicle and/or of the tractor which is not optimal or unsafe may be brought to the attention of the operator (not shown). Accordingly. by subjecting the steering wheel 12 to a predetermined altered force, the operating characteristic of the steering wheel 12 may be altered by the adjusting device 22.

Figure 2:
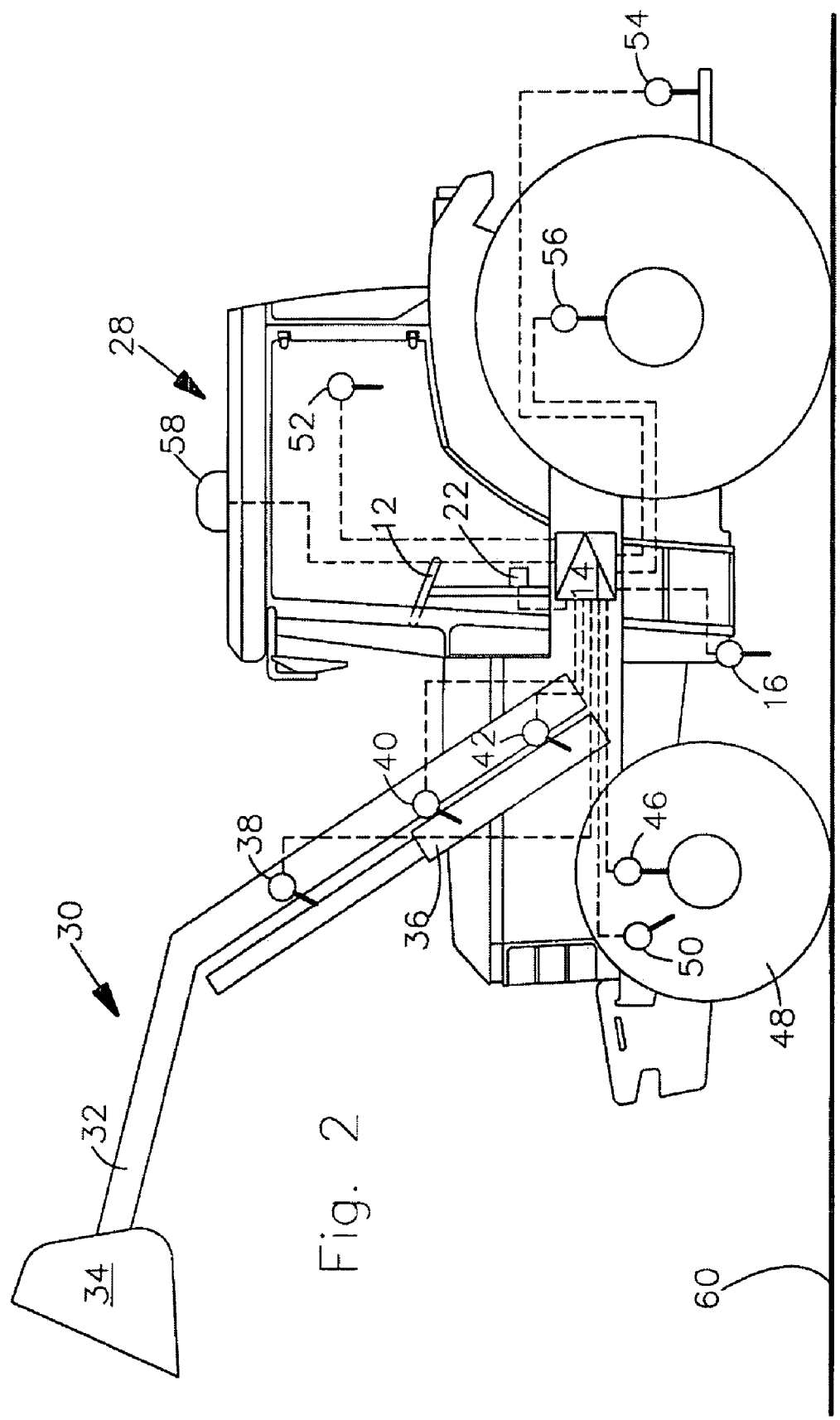
FIG. 2 is a simplified side view of an agricultural vehicle with an control system according to the invention.

FIG. 2 shows a tractor 28 which includes the control system 10. A front loader 30 is adapted to the tractor 28, which comprises an arm 32 and a loading bucket 34. The arm 32 of the front loader 30 may be raised and/or lowered by the dual-acting hydraulic cylinder 36.

A plurality of sensors are arranged on the tractor 28 and/or the front loader 30, not all sensors being required for carrying out the present invention. Thus, the travel of the piston rod of the hydraulic cylinder 36 may be determined by the sensor 38. Sensor 40 senses the alteration of the volumetric flow of the hydraulic fluid, which is supplied to the hydraulic cylinder 36 and/or which flows out of the hydraulic cylinder 36. Sensor 42 senses the pressure of the hydraulic fluid present in the piston chamber of the hydraulic cylinder 36. The sensor 16 detects the vehicle speed over the ground 60. Sensor 46 detects the speed of the left front wheel 48. Sensor (not shown) are also provided for the other three wheels. The sensor 50 detects the set steering angle of the front wheel 48. The sensor 52 detects the acceleration of the tractor 28. The sensor 54 detects the force which an implement (not shown) coupled to the tractor 28, applies to the tractor 28. Sensor 56 senses the torque transmitted to the rear drive unit. A GPS receiver 58 may be provided for receiving GPS position signals, from which the control unit 14 may detect the current position of the tractor 28. All sensors are connected to the control unit 14 by means of electrical cable connections. The adjusting device 22 is also connected with the actuator (not shown), to the control unit 14. Further sensors (not shown) may be provided with which further variables may be detected and from which a corresponding state variable of the vehicle or an operating function and/or from which a state variable of an implement adapted to the vehicle may be derived and/or determined.

FIG. 3a shows a tractor 28 pulling a trailer 62. A harvesting machine 64 drives in the same direction (arrow 66) adjacent to the tractor 28. The harvesting machine 64 has a transfer device 68 which transfers harvested crops into the trailer 62. During this transfer process, the relative position between the trailer 62 and the harvesting machine 64 should remain substantially unaltered. Reference line 70 represents an ideal and/or predetermined path of the trailer 62 and the harvesting machine 64 have in the direction of travel 66. Thus, the steering of the tractor 28 has to be adapted to the steering of the harvesting machine 64. This process is assisted by the control system according to the invention. The control system is implemented in the tractor 28.

Accordingly, the steering wheel of the tractor 28 is acted upon by a force which, as shown in FIG. 3b, depends on the steering angle relative to the reference line 70.

For a steering angle range between –A and A, a relatively small force is exerted by the adjusting device on the steering wheel. This force has at 0 angle the smallest value and rises within the steering angle range slightly and/or in a very monotonic manner. The steering angle corresponding to the values –A and A are also illustrated in FIG. 3a and are intended substantially to indicate the steering angle range, in which the transfer process between the harvesting machine 64 and the trailer 62 is still possible. If, however, the unit 28, 62 is moved further away from the harvesting machine 64 (i.e. for example to a steering angle –A), a different force characteristic curve from that shown in FIG. 3b, depending on the steering angle, could be used. For this a corresponding control program could be executed by the control device.

Accordingly, a steering wheel position and a corresponding axle angle exist, in which the operator has to apply a relatively small force for operating the steering wheel and thus is assisted when maintaining the direction of travel. If the operator wishes to increase the steering angle, a greater force has to be applied to the steering wheel. In principle, an operating device could also be provided in the harvesting machine.

FIG. 4a shows a tractor 28 to which a baler 76 is adapted. The tractor 28 and baler 76 move along the direction of travel 66. Proceeding from the position of the unit shown in FIG. 4a, at the angle A and in the direction RA a first obstruction 78 is located, which could be a tree or a drain cover (not visible generally in the field). At the angle B and the direction RB a second obstruction 79, such as a tree, is located. Information about obstructions or other events in the field of the operator could, for example, be input in a program implemented on a computer of the tractor which is coupled to a navigation system, in a map of the field.

FIG. 4b shows in a diagram the force exerted on the steering wheel by the adjusting device depending on the steering angle relative to the reference line 80, which identifies in FIG. 4a the straight-ahead travel direction. Accordingly, the steering wheel is acted upon by the adjusting device at a increasing steering angle with an increasing force, so that the operator might have to apply a greater force in order to increase or maintain the steering angle. It is thereby signaled to the operator that he is moving towards the obstruction 78. Accordingly, he can avoid the obstacle 78 to the side, a constant force being exerted on the steering wheel in the range between D1 and D2. As soon as the tractor 28 with the baler 76 has driven past the obstacle 78, the force which is exerted on the steering wheel by the adjusting device is reduced.

Figure 5B:
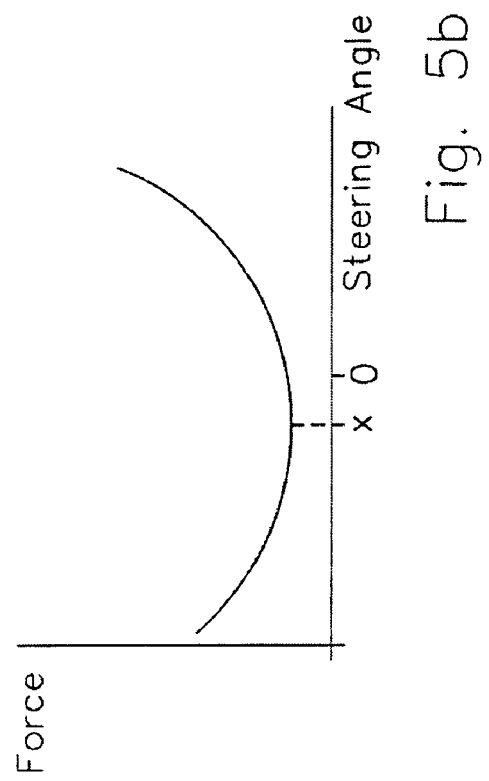
FIG. 5b is a diagram of the force exerted on the steering wheel depending on the steering angle.
Figure 5A:
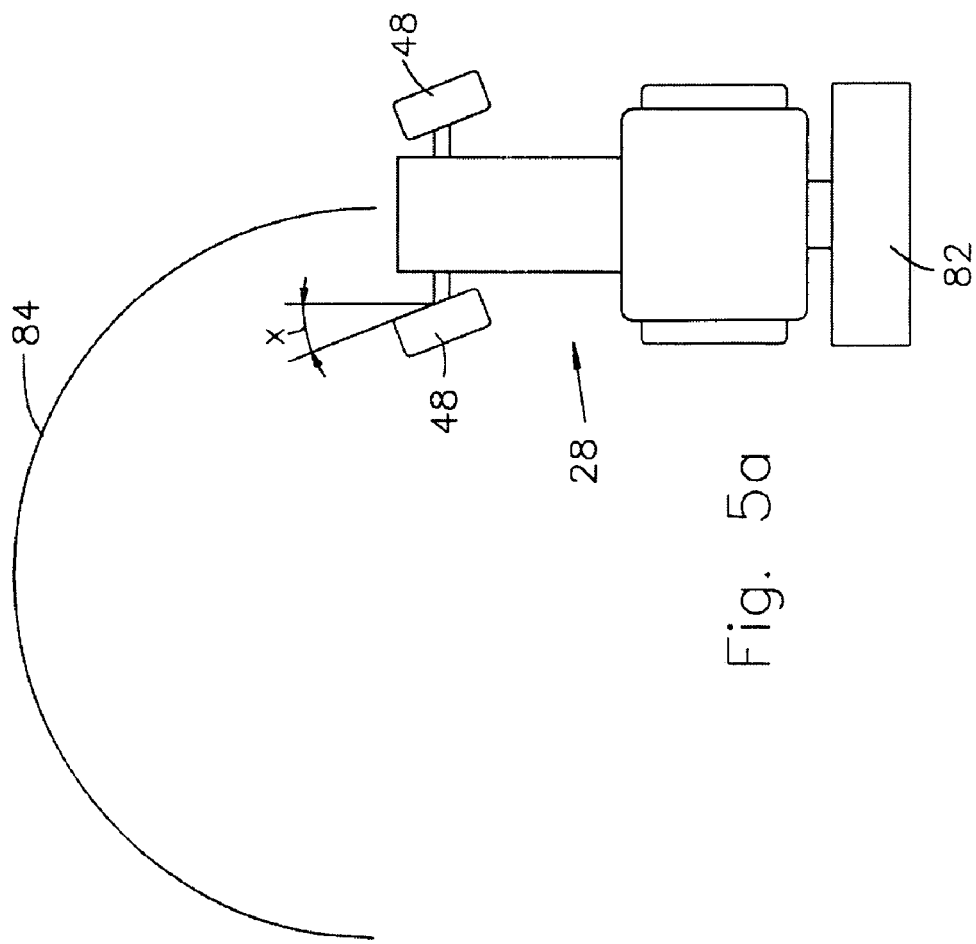
FIG. 5a is a top view of an agricultural utility vehicle in a turning manoeuvre.

FIG. 5*a* shows a tractor 28 to which a plough 82 is coupled. The tractor 28 is turning along path 84. To this end, the front wheels 48 of the tractor 28 are held at a steering angle X. As shown in FIG. 5*b*. the force exerted by the adjusting device on the steering wheel depends on the steering angle of the front wheels 48. This force is minimal at the steering angle X. The force is greater when the steering angle differs from steering angle X. Accordingly, the operator has to apply a greater force in order to deviate from the steering angle X.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A control system for a vehicle, comprising:
a steering wheel actuated by an operator to control a travel direction of the vehicle;
an adjusting device for applying a force to the steering wheel;
a sensor for sensing a vehicle parameter and transmitting a parameter signal; and
a control unit for receiving the parameter signal, the control unit, depending the parameter signal, controlling the adjusting device to apply a predetermined force to the steering wheel to make the operator aware of a condition of vehicle, wherein a steering resistance is applied to the steering wheel by the adjusting device so that the steering resistance is increased with the amount of a difference between a current position of the steering wheel and a calculated position of the steering wheel, the latter representing a safe and/or optimal operating condition of the vehicle.

2. The control system of claim 1, wherein:
the control unit, depending on a vehicle operating state, controls the adjusting device so that the steering wheel is acted upon by an altered predetermined force, so as to make the operator aware of an unsafe operating state.

3. The control system of claim 1, wherein:
the adjusting device applies a predetermined altered force to the steering wheel to vary an operating characteristic of the steering wheel.

4. The control system of claim 1, wherein:
the adjusting device comprising an electrically actuated actuator.

5. The control system of claim 1, wherein:
the adjusting device applies a substantially constant force to the steering wheel.

6. The control system of claim 1, wherein:
the adjusting device applies to the steering wheel a predetermined force function, the force function depending on the actuation path of the steering wheel.

7. The control system of claim 1, wherein:
the adjusting device acts upon the steering wheel a temporally variable force in response to a misuse of the vehicle and/or an operating function.

8. The control system of claim 1, wherein:
the adjusting device applies a predetermined altered force to the steering wheel if an operating state deviates from an optimal operating state.

9. The control system of claim 1, wherein:
the adjusting device applies a predetermined altered force to the steering wheel if an operating state deviates from a safe operating state.

10. The control system of claim 1, wherein:
the adjusting device applies a predetermined variable force to the steering wheel if a vehicle operating state differs from a predetermined threshold value.

11. The control system of claim 1, wherein:
the adjusting device applies a predetermined altered force to the steering wheel if a shaft speed deviates from a predetermined speed.

12. The control system of claim 1, wherein:
the adjusting device applies a predetermined altered force to the steering wheel if vehicle speed deviates from a predetermined speed.

13. The control system of claim 1, wherein:
the adjusting device applies a predetermined altered force to the steering wheel, and the predetermined variable force depends on vehicle speed.

14. The control system of claim 1, wherein:
the adjusting device applies a predetermined altered force to the steering wheel, and the predetermined variable force, and the predetermined variable force depends on a nature of a surface over which the vehicle travels.

15. The control system of claim 1, wherein:
the adjusting device applies a predetermined altered force to the steering wheel, and the predetermined variable force, and the predetermined variable force depends on a force to be applied to steer wheels of the vehicle.

16. The control system of claim 1, wherein:
the adjusting device applies a predetermined altered force to the steering wheel, and the predetermined variable force, and the predetermined variable force depends on a set steering angle.

17. The control system of claim 1, wherein:
the adjusting device applies a predetermined altered force to the steering wheel, and the predetermined variable force, and the predetermined variable force depends on a steering load.

18. The control system of claim 1, wherein:
the adjusting device applies a predetermined altered force to the steering wheel, and the predetermined variable force, and the predetermined variable force depends on a direction of travel.

19. The control system of claim 1, wherein:
the adjusting device applies a predetermined altered force to the steering wheel, and the predetermined variable force, and the predetermined variable force depends on a desired direction of travel.

20. The control system of claim 1, wherein:
the adjusting device applies a predetermined high force to the steering wheel while the steering wheel is in a neutral position, and the vehicle being transferred from a safe state into an operating state when the steering wheel is deflected from its neutral position by a single application of correspondingly high force by the operator.

21. The control system of claim 1, wherein:
the adjusting device applies a predetermined force to the steering wheel in order to make the operator aware of a change in a vehicle state which has been set by an operating element.

22. The control system of claim 1, wherein:
the adjusting device applies a predetermined force to the steering wheel to make the operator aware of a specific state of an implement coupled to the vehicle.

23. The control system of claim 1, wherein:
a level of the force applied to the steering wheel may be set by the operator.

24. The control system of claim 1, wherein:
the steering wheel has a mark representing a predetermined operating characteristic.

25. The control system of claim 1, wherein:
the predetermined force acts on the steering wheel to assist the operator in avoiding a disadvantageous operating state of the vehicle.

26. The control system of claim 1, wherein:
the predetermined force depends on a state of an operating element of the utility vehicle other than the steering wheel.

27. The control system of claim 1, wherein:
the force exerted by the adjusting device on the steering wheel is overridden by the operator.

28. The control system of claim 1, wherein:
a visual and/or acoustic signal is also generated.

* * * * *